United States Patent
Ishikura

(10) Patent No.: US 7,847,958 B2
(45) Date of Patent: Dec. 7, 2010

(54) IMAGE FORMING APPARATUS AND CONTROL METHOD FOR PREVENTING UNLIMITED COPYING OF AN ORIGINAL DOCUMENT INCLUDING A STORAGE DEVICE

(75) Inventor: Tomoya Ishikura, Nara (JP)

(73) Assignee: Sharp Kabushiki Kaisha, Osaka (JP)

(*) Notice: Subject to any disclaimer, the term of this patent is extended or adjusted under 35 U.S.C. 154(b) by 694 days.

(21) Appl. No.: 11/456,147

(22) Filed: Jul. 7, 2006

(65) Prior Publication Data

US 2007/0016962 A1  Jan. 18, 2007

(30) Foreign Application Priority Data

Jul. 12, 2005 (JP) .............................. 2005-203531

(51) Int. Cl.
| | |
|---|---|
| G06K 15/00 | (2006.01) |
| H04N 1/40 | (2006.01) |
| H04N 1/00 | (2006.01) |
| H04N 7/16 | (2006.01) |
| G03G 21/00 | (2006.01) |

(52) U.S. Cl. .................... 358/1.14; 358/3.24; 358/3.28; 358/401; 399/366; 726/31; 705/57; 382/306; 235/462.01; 235/375; 235/380; 235/382.5; 283/902

(58) Field of Classification Search ................ 358/1.14, 358/3.28, 401, 448, 462, 464, 468; 399/366; 235/375, 380, 382, 382.5; 283/901, 72; 382/100

See application file for complete search history.

(56) References Cited

U.S. PATENT DOCUMENTS

| | | | | |
|---|---|---|---|---|
| 5,905,798 A | * | 5/1999 | Nerlikar et al. ............... 705/57 |
| 5,982,956 A | * | 11/1999 | Lahmi ........................ 382/306 |
| 6,051,826 A | * | 4/2000 | Arimoto et al. .......... 250/208.1 |
| 6,094,279 A | * | 7/2000 | Soscia ........................ 358/1.9 |
| 6,198,875 B1 | * | 3/2001 | Edenson et al. ............... 386/94 |

(Continued)

FOREIGN PATENT DOCUMENTS

JP  2004-295171  10/2004

(Continued)

*Primary Examiner*—King Y Poon
*Assistant Examiner*—Vincent R Peren
(74) *Attorney, Agent, or Firm*—Renner, Otto, Boisselle & Sklar, LLP

(57) ABSTRACT

An image forming apparatus includes an image reading section for reading an image of a book, to which an information tag is added, so as to acquire image data. Based on information stored in the information tag, the image forming apparatus controls an image forming section. The image forming apparatus further includes a tag addition determining section, an added information determining section, and a control section. The tag addition determining section determines whether or not the information tag is added to the book, and the added information determining section determines whether or not the image data contains added information indicating that the information tag is added to the book. Further, the control section controls the image forming section not to carry out image forming, both when the added information determining section determines that the added information is contained and the tag addition determining section determines that the information tag is not added to the book. With the above structure, it is possible to prevent unlimited copying, which may occur when a storage device added to an original document is removed from the original document.

2 Claims, 10 Drawing Sheets

U.S. PATENT DOCUMENTS

| | | | |
|---|---|---|---|
| 6,441,921 B1 * | 8/2002 | Soscia | 358/1.9 |
| 6,659,353 B1 | 12/2003 | Okamoto et al. | |
| 6,883,716 B1 * | 4/2005 | De Jong | 235/492 |
| 6,983,056 B1 * | 1/2006 | Amano | 382/100 |
| 7,290,715 B2 * | 11/2007 | Sellen et al. | 235/492 |
| 2002/0170973 A1 * | 11/2002 | Teraura | 235/492 |
| 2003/0210805 A1 * | 11/2003 | Lofgren et al. | 382/100 |
| 2003/0225863 A1 | 12/2003 | Kajino et al. | |
| 2003/0227649 A1 * | 12/2003 | Kinjo | 358/1.15 |
| 2004/0035934 A1 | 2/2004 | Miyazawa et al. | |
| 2004/0193742 A1 * | 9/2004 | Ikeda | 710/1 |
| 2005/0062281 A1 * | 3/2005 | Silverbrook et al. | 283/85 |
| 2005/0094183 A1 * | 5/2005 | Kojima | 358/1.14 |
| 2005/0152006 A1 * | 7/2005 | Abe et al. | 358/3.28 |
| 2005/0168766 A1 * | 8/2005 | Troyansky et al. | 358/1.14 |
| 2005/0180566 A1 * | 8/2005 | Ryal | 380/57 |
| 2005/0200910 A1 * | 9/2005 | Kanoshima et al. | 358/448 |
| 2006/0018507 A1 * | 1/2006 | Rodriguez et al. | 382/100 |
| 2006/0126095 A1 * | 6/2006 | Tamura et al. | 358/1.14 |
| 2007/0253593 A1 * | 11/2007 | Simske | 382/100 |

FOREIGN PATENT DOCUMENTS

WO     00/34923     6/2000

* cited by examiner

FIG. 2 (a)

| IC TAG ID |
|---|
| BOOK INFORMATION |
| BOOK OWNER'S PERSONAL ID |
| PRIVATE COPYING APPROVAL FLAG |
| ALLOWED COPY COUNT |
| MONTHLY ALLOWED COPY QUOTA |
| CUMULATIVE COPY COUNT |
| YEAR MONTH 1 | YEAR MONTH 1 COPIES |
| YEAR MONTH 2 | YEAR MONTH 2 COPIES |
| ... | ... |
| YEAR MONTH N | YEAR MONTH N COPIES |

FIG. 2 (b)

| IC TAG ID |
|---|
| LINK TAG ID |
| BOOK INFORMATION |
| BOOK OWNER'S PERSONAL ID |
| PRIVATE COPYING APPROVAL FLAG |
| ALLOWED COPY COUNT |
| MONTHLY ALLOWED COPY QUOTA |
| CUMULATIVE COPY COUNT |
| YEAR MONTH 1 | YEAR MONTH 1 COPIES |
| YEAR MONTH 2 | YEAR MONTH 2 COPIES |
| ... | ... |
| YEAR MONTH N | YEAR MONTH N COPIES |

FIG. 2 (c)

| IC TAG ID |
|---|
| LINK TAG ID |
| BOOK INFORMATION |
| PAGE INFORMATION |
| BOOK OWNER'S PERSONAL ID |
| PRIVATE COPYING APPROVAL FLAG |
| ALLOWED COPY COUNT |
| MONTHLY ALLOWED COPY QUOTA |
| CUMULATIVE COPY COUNT |
| YEAR MONTH 1 | YEAR MONTH 1 COPIES |
| YEAR MONTH 2 | YEAR MONTH 2 COPIES |
| ... | ... |
| YEAR MONTH N | YEAR MONTH N COPIES | ns section for determining whether or not the image data,
IMAGE FORMING APPARATUS AND CONTROL METHOD FOR PREVENTING UNLIMITED COPYING OF AN ORIGINAL DOCUMENT INCLUDING A STORAGE DEVICE This Nonprovisional application claims priority under 35 U.S.C. §119(a) on patent application Ser. No. 203531/2005 filed in Japan on Jul. 12, 2005, the entire contents of which are hereby incorporated by reference.

FIELD OF THE INVENTION

The present invention relates to an image forming apparatus which copies a work such as a book.

BACKGROUND OF THE INVENTION

In recent years, high-performance digital complex machines have been commercialized and it has become easy to copy a work such as a book, in an almost identical form to its original work by forming an image of the work. Further, with the widespread of the Internet in these years, it has become possible to deliver image data, read out from a book or the like, to an unspecified number of users.

However, many cases concerning damage of works have occurred including a case where the copyrighted book or the like is presented in the form of image data and distributed without permission of the author. In order to prevent such unauthorized distribution of image data, for example, a technique disclosed in Patent Document 1 (Japanese Unexamined Patent Publication No. 62870/2004 (Tokukai 2004-62870, publication date: Feb. 26, 2004)) has been proposed.

Specifically, in a system disclosed in Patent Document 1, in regard to data of a work desired by a user, when a criterion allowing for use of the data is provided with a server storing the data and when the server allows for the use based on the criterion, a user can receive the data of the work from the server. This allows for private use of the data, while preventing unauthorized copying. The system allows for copying of a work in the form of data only for private use.

On the other hand, for example, Patent Document 2 (Japanese Unexamined Patent Publication No. 164551/2004 (Tokukai 2004-164551, publication date: Jun. 10, 2004)) discloses a technique for preventing unauthorized copying using a copy machine with regard to a physical work such as a book.

Patent Document 2 describes a book to which a storage medium such as an IC tag or the like is added. In the book, information concerning whether to permit reading of the book is stored beforehand, so that reading of the book is controlled based on the information.

However, such a conventional arrangement has such a problem that the book is copied without limitation after the storage medium is removed.

Specifically, in Patent Document 2, information concerning whether to permit reading of the book is stored beforehand in the storage medium added to the book. Then, based on the information, a determination is made as to whether to carry out reading of the book. However, in Patent Document 2, after the removal of the storage medium added to the book, there will be no information concerning whether to permit reading of the book, with the result that the book is read without limitation. This eventually allows unlimited copying of the book.

SUMMARY OF THE INVENTION

The present invention is made in view of the above problem, and an object of the present invention is to provide an image forming apparatus which prevents unlimited copying of an original document even when a storage device added to an object for image reading was removed from the object for image reading.

To solve the foregoing problem, an image forming apparatus of the present invention includes: an image reading section for reading an image, formed on an object for image reading (e.g. book), so as to acquire image data; an image forming section for forming an image on a sheet based on the image data; a storage device determination section for determining whether or not at least one storage device is added to the object for image reading; an added information determination section for determining whether or not the image data, acquired by the image reading section, contains added information indicating that the storage device is added to the object for image reading; and a control section for controlling, both when the added information determination section determines that the added information is contained and the storage device determination section determines that the storage device is not added to the object for image reading, the image forming section not to carry out image forming based on the image data of the object for image reading.

The storage device stores information for controlling image forming operation of the image forming section (restriction information). The storage device may be any storage medium including at least one of the following information elements: an IC tag (wireless tag), flash memory, and a hard disk, for example.

According to the arrangement, if the results of determination made by the added information determining section and determination made by the storage device determining section find (i) that the storage device is not added to the object for image reading and (ii) that image data, acquired by the image reading section, contains the added information, the control section controls the image forming section not to carry out image forming.

This prohibits image forming from being carried out as unauthorized copying, when it is determined that the storage device has removed from the object for image reading though the image data indicates that the storage device is added to the object for image reading.

With the above arrangement, normally, the image forming section can be controlled based on information stored in the storage device added to the object for image reading. On the contrary, if the storage device for controlling the image forming section has been removed intentionally, image forming operation of the image forming section can be prohibited.

Note that, (i) the added information determining section and the storage device determining section determine concurrently whether or not added information is contained (added information determination) and whether or not the storage device is added to the object for image reading (storage device determination), respectively. Alternatively, (ii) the storage device determining section may make the storage device determination after the added information determining section determines that the added information is not contained, or (iii) the added information determining section may make the added information determination after the storage device

BRIEF DESCRIPTION OF THE DRAWINGS

FIG. 2(a) is an explanatory view illustrating an exemplary data structure of book identification information stored in an information tag.

FIG. 2(b) is an explanatory view illustrating a data structure of book identification information when a link tag ID is added to the information shown in FIG. 2(a).

FIG. 2(c) is an explanatory view illustrating a data structure of book identification information when a link tag ID and page information is added to the information shown in FIG. 2(a).

DESCRIPTION OF THE EMBODIMENTS

Figure 1:
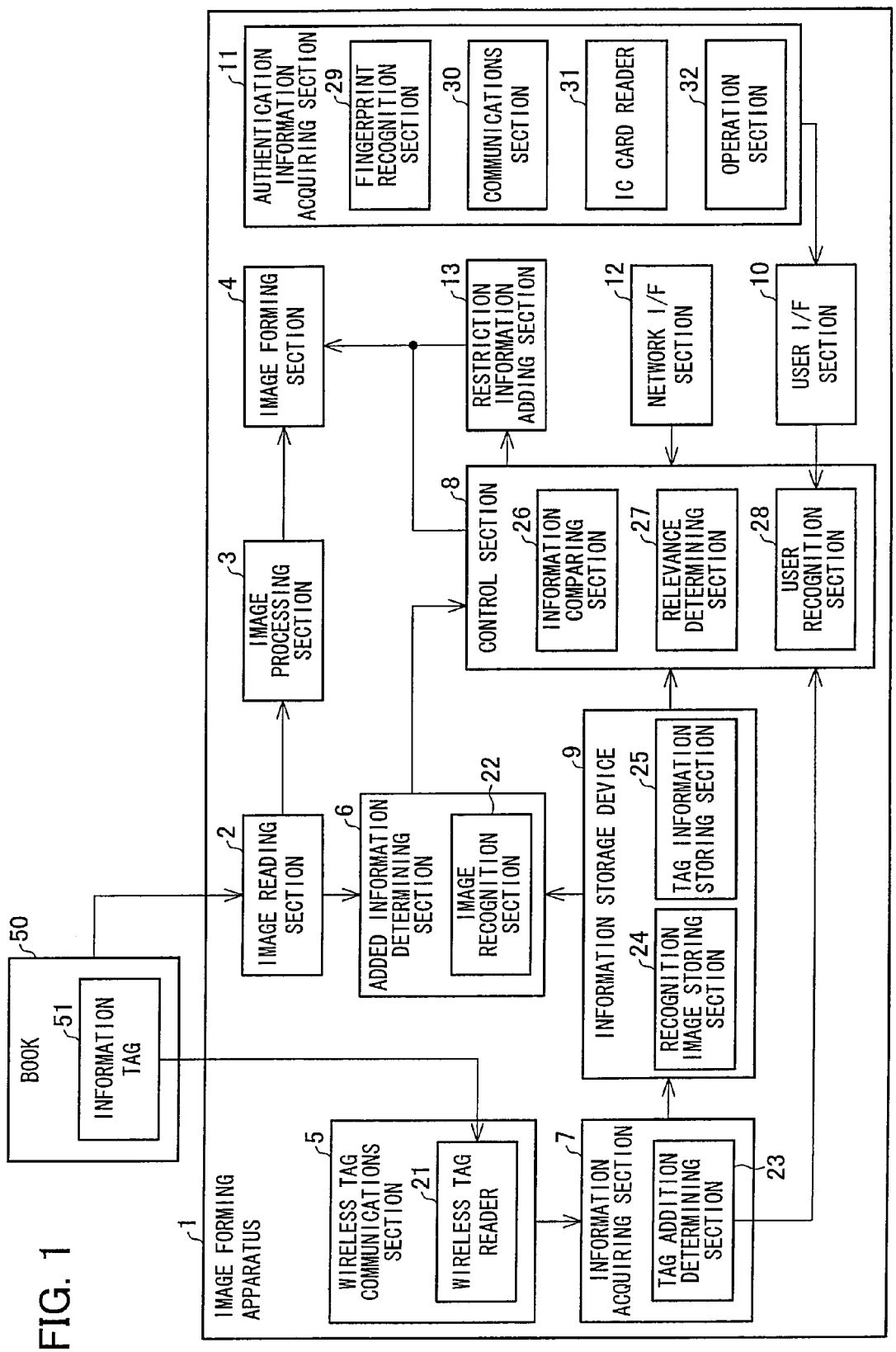
FIG. 1 is a functional block diagram schematically illustrating a structure of an image forming apparatus of a present embodiment.

One embodiment of the present invention will be described as follows. Specifically, an image forming apparatus of the present invention determines whether or not a storage medium is added to an original document and also determines, based on an image formed on the original document, whether or not the storage medium is added. When the storage medium is not added to the original document though it is determined, based on the image formed on the original document, that the storage medium is added, image forming operation is not carried out. The arrangement will be described below.

According to the present invention, the original document is not particularly limited as along as it is capable of reading an image. The original document includes a work, such as a sheet on which an image is merely stored, or a book. In the following description, the original document is a book.

In the image forming apparatus, image data is acquired from a book and an image is formed on a sheet based on the image data. Further, information stored in a storage device added to the book is read out and an image is formed based on the information. The storage device is, for example, such as a wireless tag (IC tag) or the like, (hereinafter, referred to as information tag).

First, the book is described, from which image data is read out in the image forming apparatus. In the book, an image is formed on a sheet. Further, the book includes an information tag, which stores identification information of the book (hereinafter, referred to as book identification information). The book identification information at least includes restriction information for restricting image forming operation based on the image formed on the book. That is, the book has (i) an image to be optically read out in the image forming apparatus and (ii) an image information tag which stores book identification information.

The following will describe book identification information stored in an information tag added to the book.

FIGS. 2(a) through 2(c) are views showing exemplary data structures of book identification information stored in an information tag. As shown in FIG. 2(a), the book identification information includes: an IC tag ID; book information; a book owner's personal ID; a private copying approval flag; an allowed copy count; a monthly allowed copy quota; a cumulative copy count; and copying history information.

The IC tag ID is identification information which is individually (uniquely) added to the information tag. With the IC tag ID, the information tag is identifiable from another IC tag.

The book information relates to a book in which the information tag is embedded (added). The book information includes at least one of information items, for example, such as a name of the book, a producer of the book (author), a total number of pages of the book, and the size of the book.

Note that, the book information cannot be rewritten by an image forming apparatus or the like described later. In the present embodiment, the book information is set so that the information is written during producing a book and will be exclusively read out thereafter.

The book owner's personal ID (owner's information) relates to an owner of the book. Specifically, the book owner's personal ID includes at least one of information items, for example, such as a name of the owner, and information for specifying an individual registered in basic resident register.

The private copying approval flag is information indicative of whether or not restriction is made on (i) reading of an image of the book and/or (ii) image forming based on the image data read out from the book. That is, the private copying approval flag indicates whether or not image forming based on an original document is restricted.

Specifically, the private copying approval flag includes copy restriction information and/or scan restriction information (restriction information). Further, the private copying approval flag may include information indicative of, for example, (i) approval of reading and image forming of the book, (ii) approval of making a restricted number of copies, (iii) non-approval of copying, (iv) and the like.

The allowed copy count, set to prevent copying for irrelevant purposes such as private use, indicates frequencies for allowing copying operations (image reading and image forming operations). Further, the monthly allowed copy quota, set to prevent a significant number of copying from being made during a specific time period, indicates frequencies for allowing the copying operations in a specific term. Further, the cumulative copy count indicates a cumulative number of sheets (frequencies), which have been used to copy the book.

Further, the copying history information indicates date(s) when the book was copied. Specifically, for example, frequencies of copying which has been made per month are stored as shown in FIG. 2.

Among the information items stored in the information tag, the private copying approval flag is equivalent to the restriction information. Information items other than the private copying approval flag may be suitably recorded, as appropriate.

The information tag may at least store the private copying approval flag, which is equivalent to the restriction information. The other information items may be stored, as appropriate. Further, the information tag has storage regions for storing the respective information items. That is, in this case, the information tag has: a tag ID storage region for storing the IC tag ID; a book information storage region for the storing book information; an ID information storage region for storing the book owner's personal ID; a flag information storage region for storing the private copying approval flag; an allowed copy count storage region for storing the allowed copy count; a monthly allowed copy quota storage region for storing the monthly allowed copy quota; a cumulative copy count storage region for storing the cumulative copy count; and a history information storage region for storing the history of copying.

The information tag may store various kinds of information other than the information items shown in FIG. 2(a). Specifically, for example, when a plurality of information tags are added to the book in addition to the information items shown in FIG. 2(a), a link tag ID may be stored as shown in FIG. 2(b). The link tag ID is relevance information indicative of a relevance to another information tag (i.e., an IC tag ID of another information tag).

Further, as shown in FIG. 2(c), the information tag may store information related to an image formed on a book, i.e., page information for specifying the image (stored property value).

The page information includes at least one of information elements, for example, such as a position of a header, a position of a specific picture (image), a position of text, a position of a footer, a page number indicated in the footer, and a symbol that can be identified easily and allocated in a specific portion of the page, and a picture.

FIG. 1 is a functional block diagram schematically illustrating a structure of an image forming apparatus 1 of the present embodiment.

The following will describe an image forming apparatus 1 of the present invention. As shown in FIG. 1, the image forming apparatus 1 includes a wireless tag communications section 5, an information acquiring section 7, an added information determining section 6, an image reading section 2 (image reading means), an image processing section 3, an image forming section 4 (image forming means), a control section 8 (control means), an information storage device 9, a restriction information adding section 13, a user I/F section 10, a network I/F section 12, and an authentication information acquiring section 11.

The image reading section 2 optically reads a book 50 (original document) placed on an original document stage (not shown) of the image forming apparatus 1, and converts the original document thus read to image data constituted by electronic signals. That is, by causing the image reading section 2 to read an original document 50, it is possible to acquire image data based on an image formed on the book 50.

When the original document is a book 50, normally, a user opens a page to be copied, places the book on the document stage, and presses a start bottom to provide an instruction for copying for each sheet. In this case, upon opening and closing operation of a document cover as a trigger, the image reading section 2 detects (i) whether or not an original document is present and (ii) the size of the original document. Such detection is made using an optical sensor or the like. Further, the image reading section 2 may automatically turn pages of the book 50 so as to read a plurality of pages by one operation.

The image processing section 3 suitably corrects image data acquired by the image reading section 2 so that image forming is carried out in the subsequent image forming section 4.

Specifically, according to properties of the image forming section 4, the image processing section 3 carries out color correction and tone correction on the image data read by the image reading section 2. When a copyrighted book 50 is copied, the image processing section 3 may embed copy suppression pattern or copy prohibition information in the image data so that a copy thus outputted is prevented from being used as a second original document for further copying.

Further, the image forming section 4 forms an image on a sheet based on (i) image data which is acquired by the image reading section 2 and which undergoes image processing operation performed by the image processing section 3 and (ii) externally supplied image data.

As to the image forming section 4 and the image reading section 2, detailed descriptions are omitted here since they are conventionally known components of an image forming apparatus 1, for example, such as a common copy machine.

The wireless tag communications section 5 writes and reads data to and from an information tag 51, which is added to the book 50. Further, the wireless tag communications section 5 includes a wireless tag reader 21.

The wireless tag reader 21 reads out book identification information from an information tag 51 (wireless IC tag). The information tag 51 is an information storage medium added to the book 50. Further, the wireless tag communications section 5 updates some information items stored in the information tag 51, i.e., cumulative copy count and copying history information.

The information acquiring section 7 acquires, through the wireless tag communications section 5, book identification information stored in the information tag 51 to the book 50. Further, the information acquiring section 7 includes a tag addition determining section 23 (storage device determination means).

The tag addition determining section 23 determines whether or not the information tag 51 is added to the book 50. Specifically, if the information acquiring section 7 cannot acquire book identification information stored in the information tag 51, i.e., if the book identification information cannot be acquired because the information tag 51 is not added to the book 50, the tag addition determining section 23 determines that the information tag 51 is not added to the book 50. On the contrary, if the book identification information is acquired by the information acquiring section 7, the tag addition determining section 23 determines that an information tag 51 is added to the book 50.

The added information determining section 6 (added information determination means) analyzes image data acquired by the image reading section 2, so as to determine whether or not the image data contains added information indicating that an information tag 51 is added to the book 50.

Specifically, the added information determining section 6 causes an image recognition section 22, provided in the added information determining section 6, to determine whether or not the image data acquired by the image reading section 2 contains reference information stored in a recognition image storing section 24. With the result of determination made by the image recognition section 22, the added information determining section 6 determines whether or not the image data contains added information.

The image recognition section 22 (property value calculating means, extracting means) analyzes the image data and extracts added information from the image data. Further, the image recognition section 22 separates specific image information or other information from the image data. Specifically, the image recognition section 22 carries out an image recognition process, such as an OCR process for example, on the image data and extracts the added information contained in the image data. Further, the image recognition section 22 extracts identification information for specifying an information tag 51 added to the book 50 (e.g. the IC tag ID or the like). The identification information is inherent information (distinction information) of an individual information tag (storage device) 51. The added information and the identification information may be the same or different. That is, the identification information may serve as added information.

Further, the image recognition section 22 may analyze the image data, so as to obtain a property value for specifying an image formed on the book 50. Specifically, the image recognition section 22 carries out image processing such as an OCR process, or a region separation process, so as to obtain a property value for specifying an image formed on the book 50. The property value is information contained in the image data. Examples of the property value include (i) character information concerning letter strings, symbols, numeric characters, and the like, which are stored in a specific region of the book 50, (ii) image information stored in a specific region of the book 50, and (iii) a ratio of regions for respective images separated by the region separation process (a calculated ratio of separated image regions such as a letter region, a background region, a halftone and photo region).

The control section 8 controls operations of components of the image forming apparatus 1. Further, the control section 8 controls operations of the image forming section 4, based on the results of determination made by the added information determining section 6 and determination made by the tag addition determining section 23. As to how the control section 8 controls the image forming section 4, description will be made later.

Further, the control section 8 may include an information comparing section 26 (device determination means, similarity determination means), a relevance determining section 27 (relevance determination means), and a user recognition section 28, as appropriate.

The information comparing section 26 compares the book identification information acquired by the information acquiring section 7 with a property value or identification information obtained by the image recognition section 22 from image data. Specifically, for example, when the image recognition section 22 obtains (extracts) identification information (i.e., an IC tag ID of an information tag 51 added to the book 50) from the image data or added information contained in the image data, the information comparing section 26 compares the IC tag ID obtained by the image recognition section 22 with an IC tag ID acquired by the information acquiring section 7 and stored in the information tag 51. In this way, the information comparing section 26 determines whether or not the both IDs match.

Further, when the image recognition section 22 obtains the property value from the image data, the information comparing section 26 compares the property value with page information stored in the information tag 51 (i.e., specifically, page information read out from the information tag 51 and stored in a tag information storing section 25), so as to calculate a similarity of the both values). If the similarity thus found is a certain value or greater, the information comparing section 26 determines that the both values match.

The relevance determining section 27, in the event where a plurality of information tags 51 are stored in the book 50, determines whether the information tags 51 are relevant to each other. Specifically, the relevance determining section 27 refers to book identification information acquired by the information acquiring section 7, i.e., book identification information stored by the information acquiring section 7 into the tag information storing section 25 of the information storage device 9. Then, based on link tag IDs contained in the book identification information, the relevance determining section 27 determines each relevance to one of the plural information tags 51 added to the book 50. A process for determining the relevance will be described later.

The user recognition section 28 carries out authentication of a user copying the book 50. Specifically, the user recognition section 28 collates a personal ID of an owner of the book 50 stored in the information tag 51 with user information entered through the user I/F section 10. In this way, the user recognition section 28 determines whether or not a user performing image forming based on the book 50 is an owner of the book 50.

The control section 8 controls image forming operation carried out by the image forming section 4, based on (i) the result of determination made by the added information determining section 6, (ii) the result of determination made by the tag addition determining section 23, and (iii) at least one of the results of: comparison made by the information comparing section 26; determination made by the relevance determining section 27 concerning the relevance; and user authentication carried out by the user recognition section 28. A process of controlling the image forming operation will be described later in detail.

The information storage device 9 stores various kinds of information. Examples of the information storage device 9 are non-volatile memory devices such as flash memory and a hard disk. The information storage device 9 includes an authentication image storing section 24 and a tag information storing section 25. The authentication image storing section 24 stores a reference image (hereinafter, referred to as authentication image) used by the added information determining section 6 to determine whether or not the image data contains added information, i.e., whether or not an image formed on the book 50 contains added information. The added information determining section 6 checks whether or not an image extracted by the image recognition section 22 from image data (obtained added information) matches an authentication image stored in the authentication image storing section 24, so as to determine whether or not the image data contains added information. For this purpose, the authentication image storing section 24 stores criteria, with which the added information determining section 6 determines whether or not the image data contains added information. Examples of the criteria include an authentication image indicative of added information, rules for checking and determining whether or not added information is contained, etc.

The tag information storing section 25 stores book identification information acquired by the information acquiring section 7. The information acquiring section 7, when it acquires book identification information from the information tag 51, causes the tag information storing 7section 25 to store the book identification information.

The network I/F section 12 sends and receives various kinds of data including image data to and from, for example, a user terminal (personal computer), a server, and the like, which are connected to the image forming apparatus 1.

The user I/F section 10 obtains authentication information from the authentication information acquiring section 11 described below.

The information acquiring section 11 acquires authentication information from a user. Specifically, the information acquiring section 11 includes a fingerprint recognition section 29, a communications section 30, an IC card reader 31, and an operation section 32.

The fingerprint recognition section 29 acquires authentication information by reading fingerprint of a user. The communications section 30 acquires authentication information by, for example, communicating with a portable telephone or the like. The IC card reader 31 acquires authentication information by externally reading an IC card. The operation section 32 acquires authentication information through user's entry by manipulating, for example, a numeric keypad, a keyboard, a touch panel, and the like.

Further, the image forming apparatus 1 may include a restriction information adding section 13 for adding restriction information to a sheet, on which an image is formed by the image forming section 4. The restriction information indicates restriction or prohibition of image forming based on the image.

Figure 3:
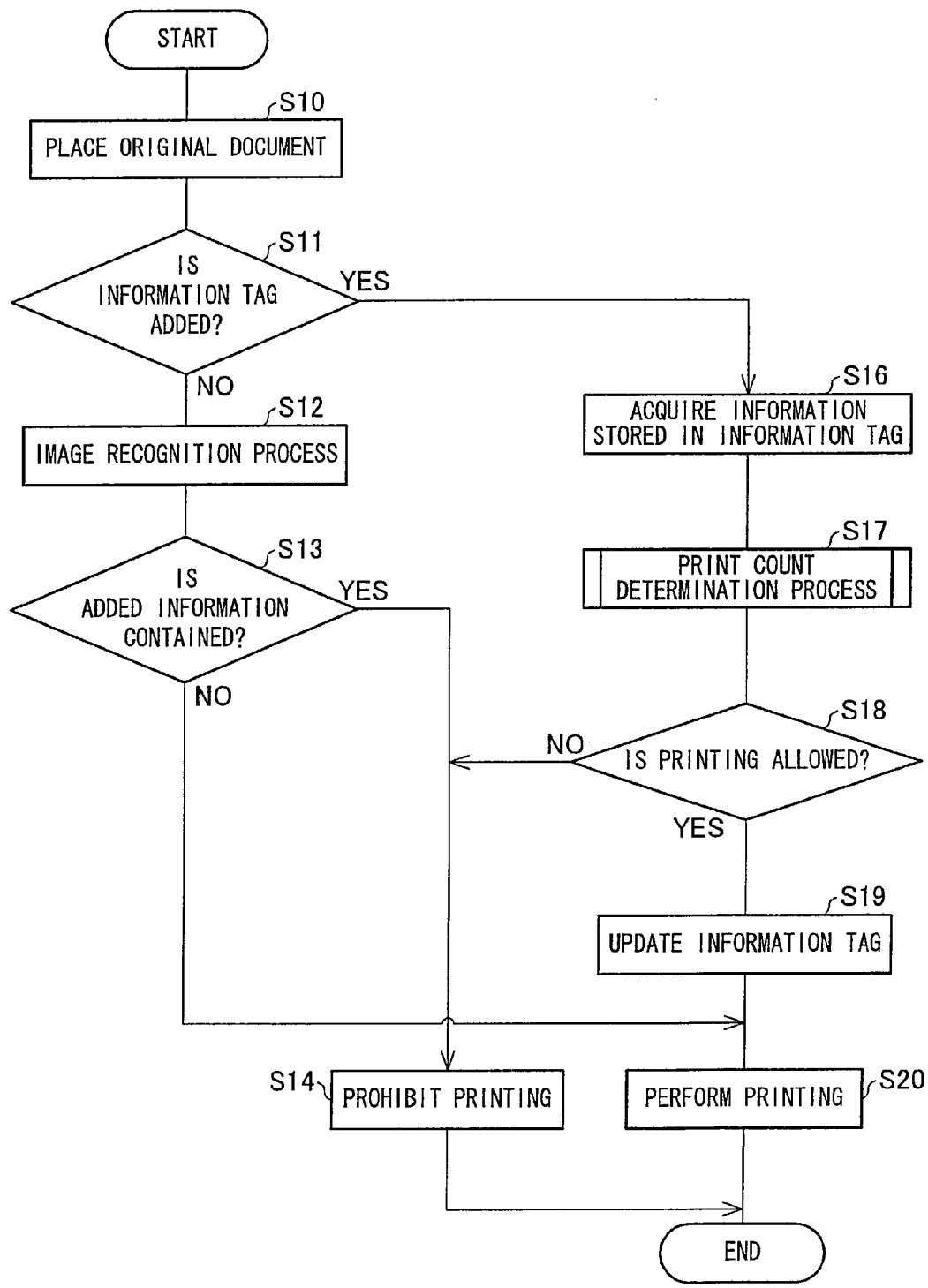
FIG. 3 is a flow chart representing a sequence of how a control section operates to control an image forming section, based on the results of determination made by an added information determining section and determination made by a tag addition determining section.

Referring to FIG. 3, the following will describe the control process for controlling operations of the image forming section 4 based on the results of determination made by the added information determining section 6 and determination made by the tag addition determining section 23. FIG. 3 is a flow chart presenting the control process.

First, a work, i.e., a book 50, is placed by a user on the document stage of the image forming apparatus 1, and an instruction for starting copying is made by the user (S10). Here, upon placement of the book 50 on the document stage, the image forming apparatus 1 causes the image reading section 2 to read an image formed on the book 50 for temporary reading (or for final reading). Upon placement of the book 50 on the document stage, the tag addition determining section 23 causes the wireless tag communications section 5 to determine whether or not an information tag 51 is added to the book 50 (S11). Specifically, the tag addition determining section 23 checks whether or not the information acquiring section 7 acquires, through the wireless tag communications section 5, book identification information stored in an information tag 51 added to the book 50. In this way, the tag addition determining section 23 determines whether or not an information tag 51 is added to the book.

In the step S11, if the result of determination finds that an information tag 51 is not added to the book 50 (NO in S11), the tag addition determining section 23 sends to the control section 8 information indicating that an information tag 51 is not added to the book 50. In response to a signal of the information from the tag addition determining section 23, the control section 8 sends to the added information determining section 6 an instruction for determining whether or not image data contains added information.

In response to the instruction concerning determination on added information, the added information determining section 6 obtains image data read by the image recording section 2 from an image formed on the book 50. Then, the added information determining section 6 causes the image recognition section 22 to carry out an image recognition process (analysis) on the image data (S12). The added information determining section 6 then determines whether or not the image data contains added information (S13). The determination is made by determining whether or not the image data contains information (image) identical to an authentication image stored in the authentication image storing section 24. If the image recognition section 22 determines that the image data contains an image identical to the authentication image, the added information determining section 6 determines that the image data, i.e., the image formed on the book 50, contains added information.

In the step S13, if it is determined that the image data contains added information (YES in S13), the added information determining section 6 sends to the control section 8 information indicating that the added information is contained.

With the information received from the added information determining section 6, the control section 8 determines that the information tag 51 was intentionally removed though the information tag 51 had been initially added to the book 50 (that is, the control section 8 determines that unauthorized copying is to be made), and prohibits image forming operation of the image forming section 4 (S14). Further, the control section 8 causes a notifying section (not shown) to notify external apparatuses that the image forming operation is prohibited.

On the contrary, in the step S13, if it is determined that the image data does not contain added information (NO in S13), the added information determining section 6 sends to the control section 8 information indicating that the added information is not contained. With the information received from the added information determining section 6, the control section 8 determines that an information tag 51 has not been initially added to the book 50, and causes the image forming section 4 to carry out image forming operation (S20).

In the step S11, if it is determined that an information tag 51 is added (YES in S11), the information acquiring section 7 acquires book identification information stored in the information tag 51 (S16). The information acquiring section 7 then stores the acquired book identification information into the tag information storing section 25 of the information storage device 9.

Next, the control section 8, when it detects that the book identification information is stored in the tag information storing section 25, carries out a print count determination process for determining whether or not the number of sheets to be used for image forming based on the book 50 exceeds an allowed number (S17). The print count determination process will be described later.

After the print count determination process in the step S17, the control section 8 determines whether or not image forming operation, i.e., printing operation, can be carried out by the image forming section 4 (S18). The determination as to whether to carry out printing operation is made based on the result of the print count determination process. However, the determination may be made by carrying out another process, for example, user authentication or the like.

In the step S18, if the result of determination finds that printing is allowed, the control section 8 causes the wireless tag communications section 5 to update the information stored in the information tag 51 added to the book 50 (S19). The updating operation is performed based on the book identification information stored in the tag information storing section 25. In the case here, a cumulative copy count and copying history information, stored in the information tag 51, are updated as shown in FIG. 2(*a*).

Then, the control section 8 causes the image forming section 4 to carry out a printing process (S20).

Note that, in the step S18, if the result of determination finds that printing is not allowed (NO in S18), the sequence goes to step S14 and printing process is prohibited.

In this way, in the image forming apparatus 1, image forming operation by the image forming section 4 is restricted, when an information tag 51 is not added though an image formed on the book 50 contains added information indicative addition of the information tag 51.

The following will describe the print count determination process in S17. The print count determination process is carried out by the control section 8. Note that, the following deals with a case where an information tag 51 added to the book 50 stores a cumulative copy count, an allowed copy count, copying history information, and a monthly allowed copy quota, as shown in FIG. 2(a) through 2(c).

Figure 4:
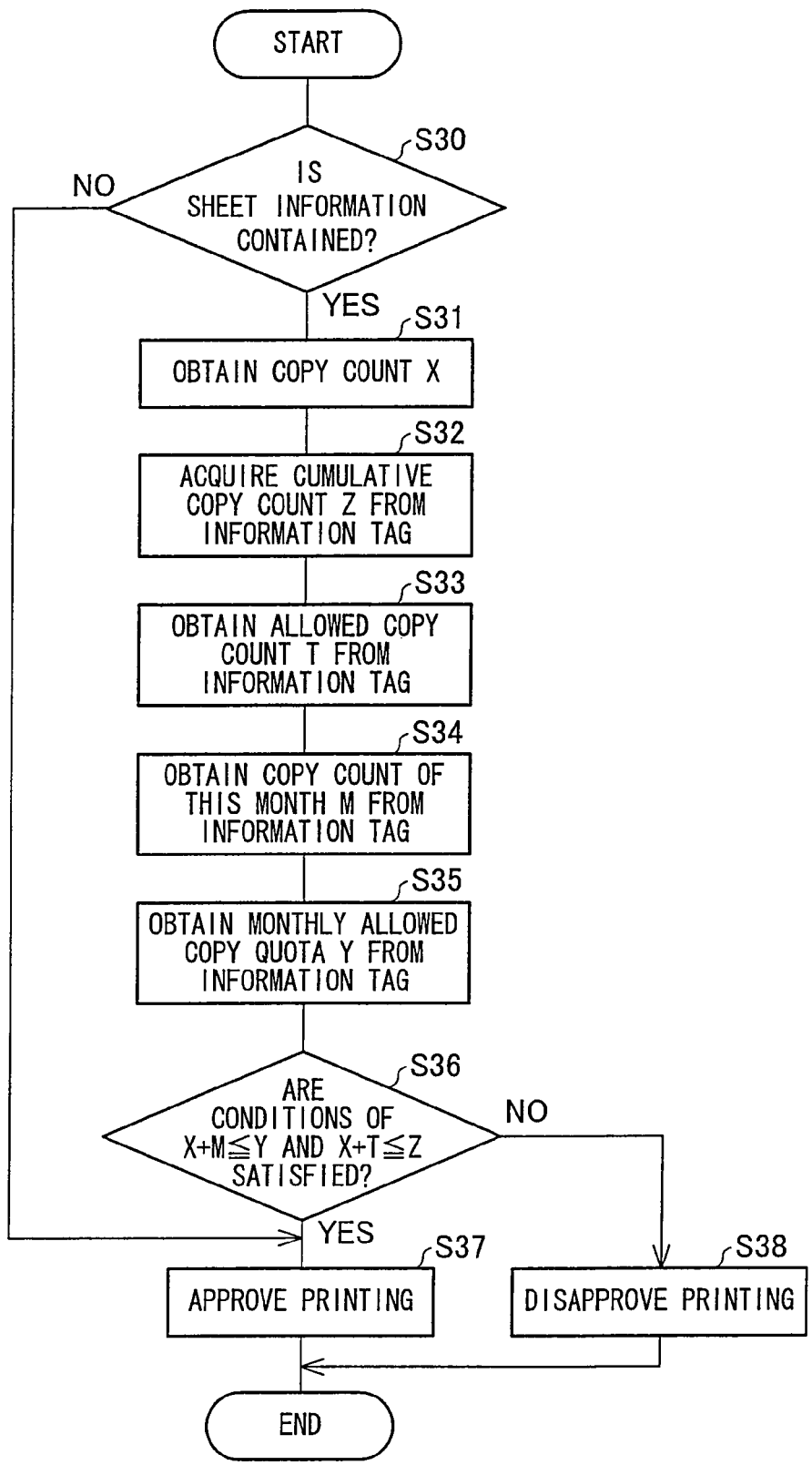
FIG. 4 is a flow chart representing a print count determination process shown in FIG. 3.

FIG. 4 is a flow chart representing the print count determination process.

First, the control section 8 determines whether or not book identification information, stored in the tag information storing section 25, includes copy count information (a cumulative copy count, an allowed copy count, copying history information, and a monthly allowed copy quota) (S30). In the step S30, if the result of determination finds that the sheet information is not contained (NO in S30), the control section 8 approves printing (S37) and finishes the process.

On the contrary, in the step S30, if the result of determination finds that the sheet information is contained (YES in S30), the control section 8 obtains information on the number of sheets to be copied X, which is entered by a user through the user I/F section 10 (S31). Next, the control section 8 obtains a cumulative copy count Z (S32), an allowed copy count T (S33), the number of copies to be made this month M (S34), a monthly allowed copy quota Y (S35), from the book identification information stored in the tag information storing section 25.

Based on the sheet information thus obtained, the control section 8 determines whether or not the conditions specified by $X+M<Y$ and $X+T<Z$ (S36) are satisfied.

In the step S36, if it is determined that the conditions are satisfied (YES in S36), the control section 8 approves printing (S37) and finishes the process. On the contrary, in the step S36, if it is determined that the conditions are not satisfied (NO in S36), the control section 8 disapproves printing (S38) and finishes the process.

In this way, the control section 8 carries out the print count determination process.

Figure 5:
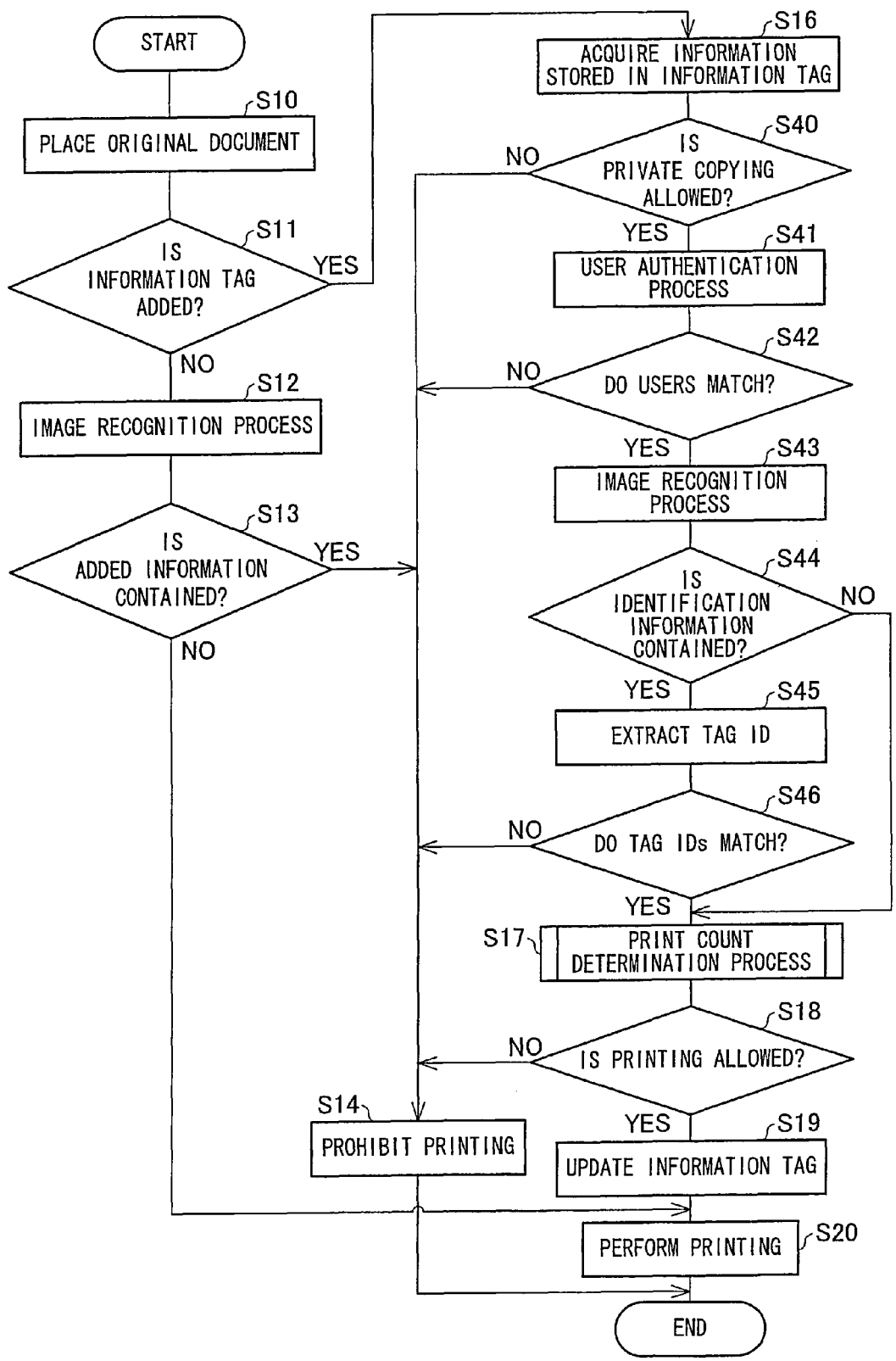
FIG. 5 is a flow chart representing another example of the control operations of the control section, shown in FIG. 3. The sequence further includes a user authentication process and a process for determining whether or not an information tag added to a book is authenticated.

Referring to FIG. 5, the following will describe a control process for controlling the operations of the image forming section 4. In the control process represented in FIG. 5, the operations of the image forming section 4 are controlled based on the results of (i) determination made by the added information determining section 6 and (ii) determination made by tag addition determining section 23. Further, the operations of the image forming section 4 are controlled by carrying out (iii) a user authentication process and (iv) a determination process for determining whether or not an information tag 51 added to the book 50 is authenticated. FIG. 5 is a flow chart representing another example of the control process. Note that, in the following description, steps being identical to those described above are indicated by the same numerals (step numbers) for simplicity and their descriptions are omitted.

When an original document, i.e., a book 50, is placed on the document stage by a user (S10) and an instruction for starting copying is made, the tag addition determining section 23 causes the wireless tag communications section 5 to determine whether or not an information tag 51 is added to the book 50 (S11). In the step S11, if the result of determination finds that an information tag 51 is not added to the book 50 (NO in S11), the added information determining section 6 causes the image recognition section 22 to determine whether or not the image data contains added information (S13). If it is determined that the image data contains added information (YES in S13), the control section prohibits image forming operation of the image forming section 4 (S14). On the contrary, if it is determined that the image data does not contain added information (NO in S13), the control section 8 determines that image forming operation of the image forming section 4 is allowed (S20).

In the step S11, if the result of determination finds that an information tag 51 is added (YES in S11), the information acquiring section 7 acquires book identification information stored in the information tag 51 (S16). The information acquiring section 7 then stores the book identification information thus acquired into the tag information storing section 25 of the information storage device 9.

Next, the control section 8 refers to book identification information stored in the tag information storing section 25, so as to determine whether or not image forming based on the book is allowed (S40). Specifically, the control section 8 refers to the book identification information, so as to check whether or not a private copying approval flag contained in the book identification information is ON. In the step S40, if it is determined that the private copying approval flag is not ON, i.e., if image forming based on the book is not allowed (NO in S40), the process of the control section 8 proceeds to step S14 and image forming operation based on the book 50 is prohibited On the contrary, in the step S40, if the private copying approval flag is ON, i.e., if image forming based on the book is allowed (YES in S40), the control section 8 causes the user recognition section 28 to carry out the user authentication process (S41). Specifically, the user recognition section 28 obtains from the tag information storing section 25 a personal ID, contained in the book identification information, concerning an owner of the book 50. Next, the user recognition section 28 obtains authentication information entered through the user I/F section 10. The authentication information is entered by a user through the information acquiring section 11. As to how the authentication information may be entered, specifically, a user may cause the IC card reader to read his or her IC card, or a user may manipulate 10 keys (numeric keypad), a keyboard, and/or a touch panel, for example. Alternatively, the authentication information may be entered, for example, through infrared data communication provided in a portable terminal such as a portable telephone or the like or by operating the fingerprint recognition section 29.

Then, the user recognition section 28 collates the entered authentication information with the obtained personal ID, so as to determine whether or not the collation finds a match concerning the user information (S42).

In the step S42, when the collation does not find a match concerning the user information (NO in S42), the process of the control section 8 proceeds to step S14, and the image forming operation based on the book 50 is prohibited.

On the contrary, when the collation finds a match concerning the user information (YES in S42), the control section 8 sends to the added information determining section 6 an instruction for determining whether or not the image data contains identification information.

In receiving the instruction for determining whether or not the image data contains identification information, the added information determining section 6 obtains image data read out by the image reading section 2 from an image formed on the book 50. The added information determining section 6 then causes the image recognition section 22 to carry out an image recognition process (analysis) on the image data (S43). Further, the added information determining section 6 causes the image recognition section 22 to determine whether or not the image data contains identification information for specifying an information tag 51 such as IC tag ID or the like, which is added to the book 50 (S44).

In the step S44, if it is determined that identification information is contained (YES in S44), the added information determining section 6 causes the image recognition section 22 to obtain the identification information (IC tag ID, in this case) from the image data (S45), and sends the identification information thus obtained to the information comparing section 26 of the control section 8. In receiving the identification information, the information comparing section 26 obtains an IC tag ID stored in the tag information storing section 25, which is inherent information of the information tag 51. The information comparing section 26 then compares the IC tag ID received from the added information determining section 6 with the IC tag ID stored in the tag information storing section 25. In this way, the information comparing section 26 determines whether or not the IC tag IDs match (S46).

In the step S46, if there is no match (NO in S46), the process of the control section 8 proceeds to step S14, and the image forming operation based on the book 50 is prohibited.

On the contrary, in the step S46, if there is a match (YES in S46), the control section 8 carries out print count determination process (S17). Then, based on the result of the print count determination process, the control section 8 determines whether or not image forming operation is allowed, so as to prohibit or permit image forming (S14, and S18 through S19).

In the step S44, if it is determined that identification information is not contained, the sequence goes to step S17.

As such, in the image forming apparatus 1, when an information tag 51 is added to the book 50, book identification information stored in the information tag 51 may be used to carry out (i) the user authentication process and (ii) the process for comparing identification information specifying the information tag 51 with the information tag 51. This enables determination to be made as to whether or not a user performing image forming is an owner of the book 50. Further, it is possible to determine whether or not the information tag 51 added to the book 50 has been initially added to the book 50, i.e., whether or not the information tag 51, which had been added to the book 50, was replaced by another information tag.

In the image forming apparatus 1, in the event where a plurality of information tags 51 are added to the book 50 and where book identification information stored in each of the information tags 51 contains, for example, page information and a link tag ID as shown in FIG. 2(c), a control process below may be carried out. The control process will be described referring to a flow chart of FIG. 6.

Figure 6:
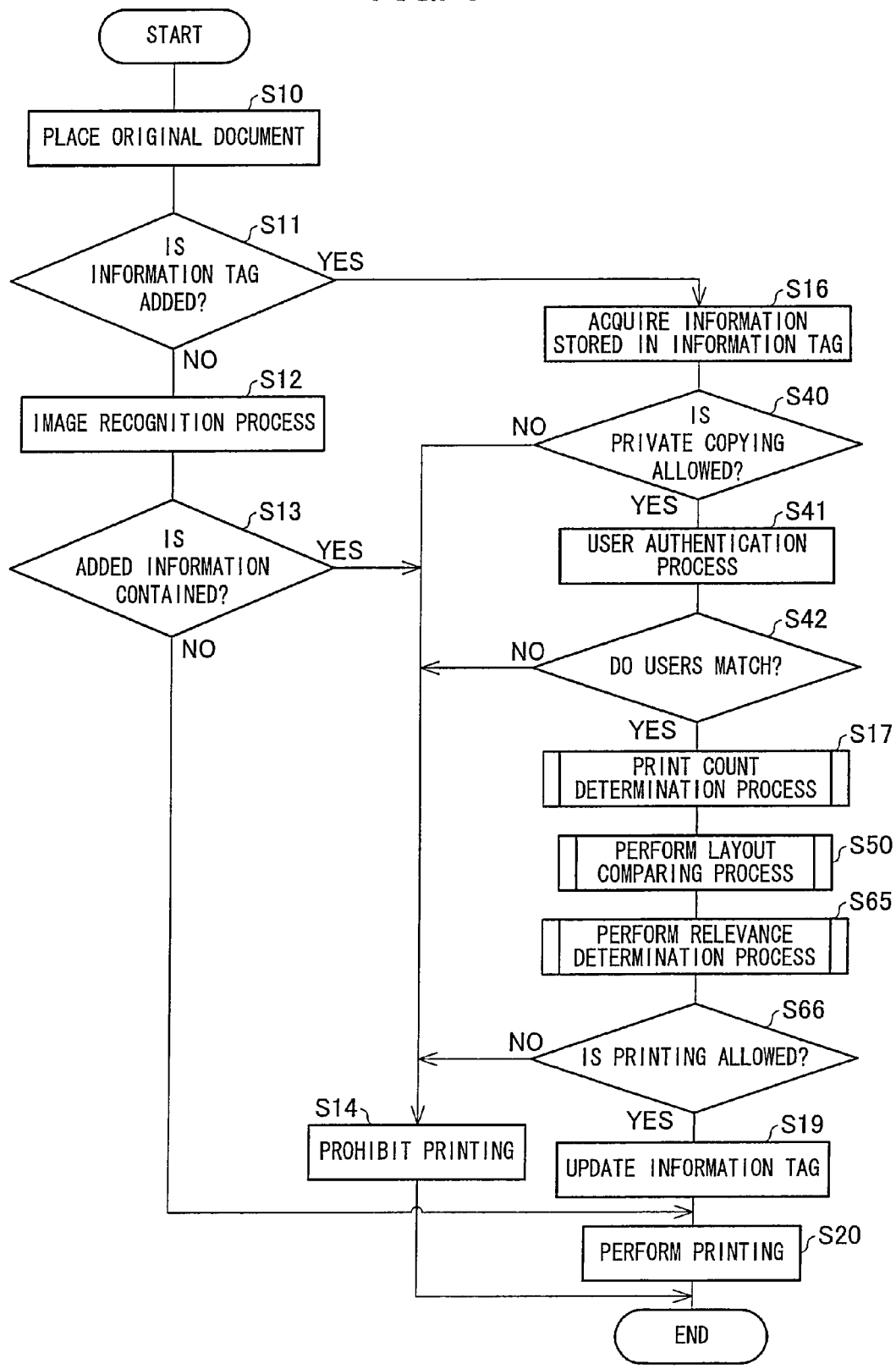
FIG. 6 is a flow chart representing still another example of the control operations of the control section, shown in FIG. 3. The sequence further includes a user authentication process, a layout comparing process, and a relevance determination process.

FIG. 6 is a flow chart representing another example of the control process. Note that, in the following description, steps being identical to those described above are indicated by the same numerals (step numbers) for simplicity and their descriptions are omitted When an original document, i.e., a book 50, is placed on the document stage by a user (S10) and an instruction for starting copying is made, the tag addition determining section 23 causes the wireless tag communications section 5 to determine whether or not an information tag 51 is added to the book 50 (S11). In the step S11, if the result of determination finds that an information tag 51 is not added to the book 50 (NO in S11 ), the added information determining section 6 causes the image recognition section 22 to determine whether or not the image data contains added information (S13). If it is determined that the image data contains added information (YES in S13), the control section prohibits image forming operation of the image forming section 4 (S14). On the contrary, if it is determined that the image data does not contain added information (NO in S13), the control section 8 determines that image forming operation of the image forming section 4 is allowed (S20).

In the step S11, if it is determined that an information tag 51 is added (YES in S111), book identification information stored in the information tag 51 is read out (S16). Based on the book identification information, the control section 8 determines whether or not image forming based on the book 50 is allowed (S40). If the result of determination finds that image forming is allowed, the control section 8 causes the user recognition section 28 to carry out a user authentication process (S41), so as to determine whether or not a user performing image forming is an owner of the book 50 (S42).

In the step S42, if the result of determination finds that the user is an owner of the book 50 (a user allowed to perform image forming) (YES in S42), the control section 8 carries out the print count determination process (S17). The control section 8 then causes the information comparing section 26 to carry out a layout comparing process (S50), and further causes the relevance determining section 27 to carry out a relevance determining process (S65). The layout comparing process and the relevance determining process will be described later.

Thereafter, based on the results of (i) the print count determination process, (ii) the layout comparing process, and (iii) the relevance determining process, the control section 8 determines whether to carry out image forming (S66). Specifically, if all the results of the three determinations processes find that printing is allowed, the control section 8 decides to carry out image forming (YES in S66). In other cases, however, the control section 8 decides to prohibit image forming (NO in S66). As such, based on the result of determination in the step S66, the control section 8 controls the image forming section 4 (S14 or S19 through S20).

Figure 7:
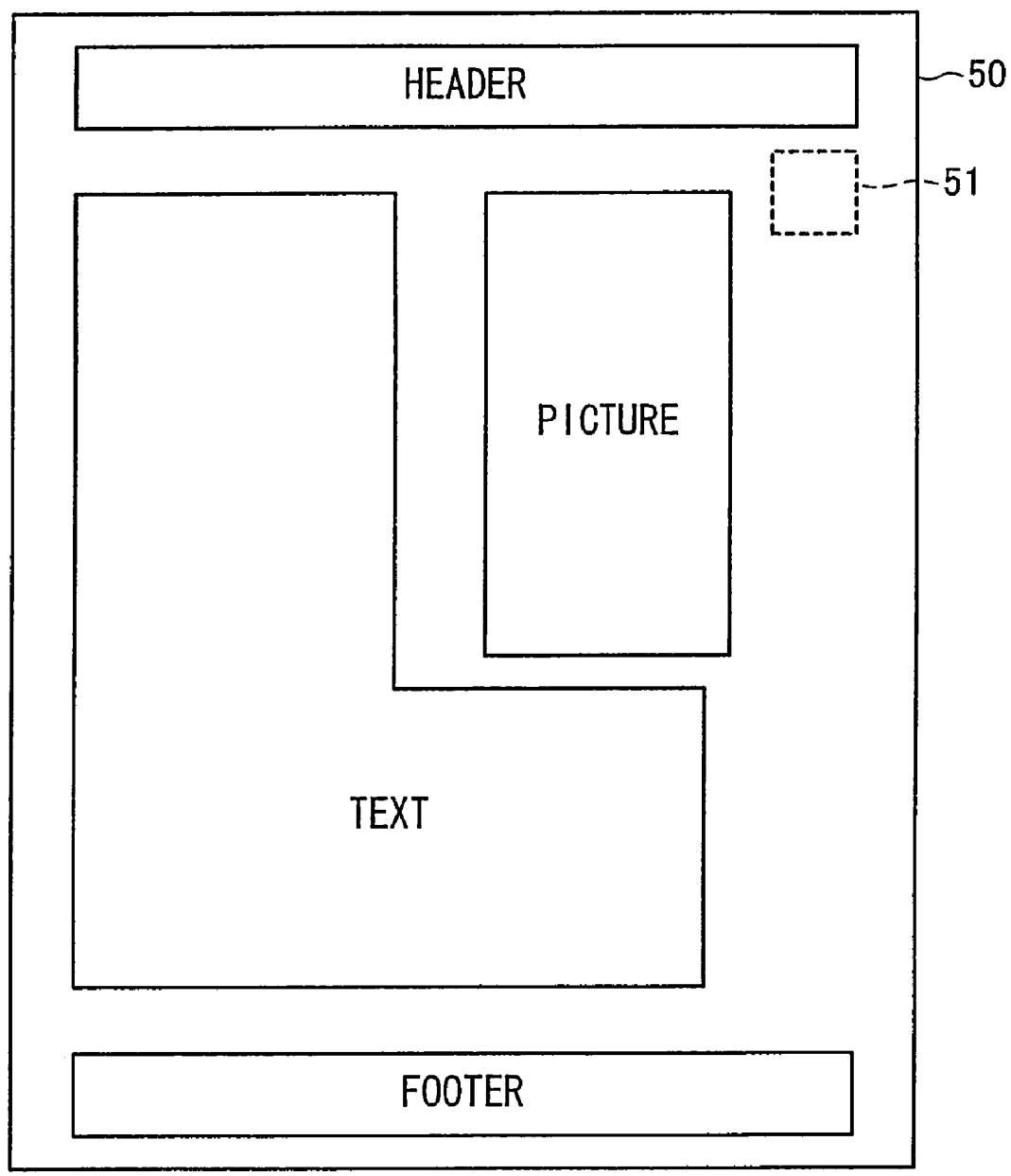
FIG. 7 is a view illustrating an image formed on a book by way of example.
Figure 8:
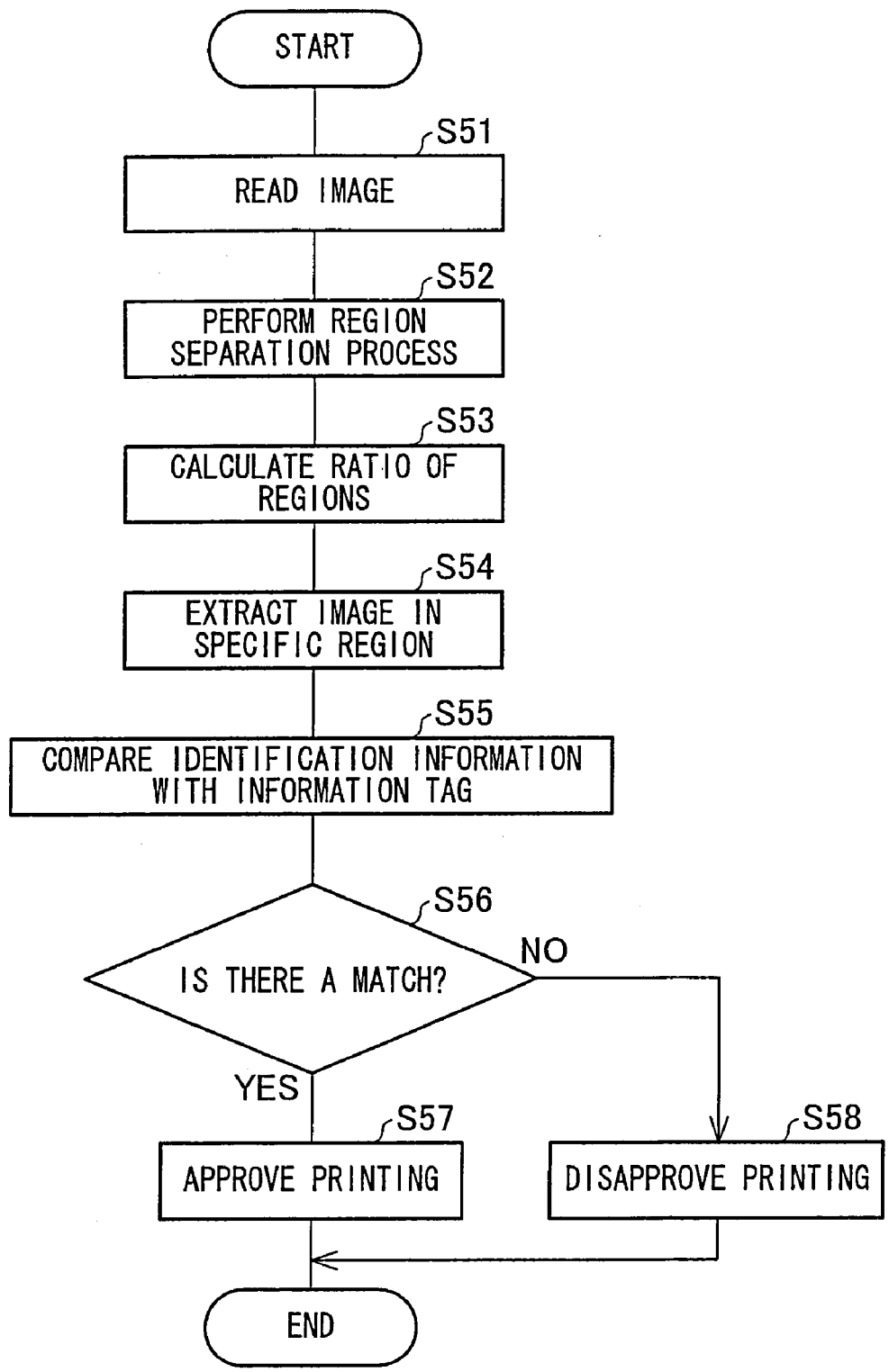
FIG. 8 is a flow chart representing the layout comparing process shown in FIG. 6.

Referring to FIGS. 7 and 8, the following will describe the layout comparing process. FIG. 7 is a view illustrating a layout of an image formed on the book 50 by way of example, and FIG. 8 is a flow chart representing the layout comparing process.

For example, when an image formed on the book 50 is constituted by a header, text, a picture, and a footer, as shown in FIG. 7, for example, a ratio of the text to the entire book 50 or the like is stored beforehand into the information tag 51 as page information. Then, the book 50 is read out by the image reading section 2 to acquire image data, the acquired image data is analyzed, and a ratio of the text to the entire book 50 is calculated. Further, the found ratio of the text is compared with the stored page information, and thereby determination is made as to whether or not an information tag 51 storing the page information has been initially added to the book 50.

As such, in the layout comparing process, information specific to an image formed on the book 50 has been stored in an information tag 51 beforehand, and the result of reading the image is compared with the information stored in the information tag 51. Note that, the page information is not limited to the ratio of the text, and may be information concerning, for example, letters, logos, symbols, numerals and/or the like, which are formed on a specific region of the book 50.

Referring to FIG. 8, the following will describe the layout comparing process.

First, the image reading section 2 reads out an image (S51), so as to acquire image data. Then, the image recognition section 22 analyzes the image data. Specifically, the image recognition section 22 separates the image data into regions, for example, such as a letter region, a background region, and a halftone and photo region (S52). Further, the image recognition section 22 calculates a ratio of the regions to the entire book 50 (S53). Further, the image recognition section 22 extracts an image formed on a specific region of the book 50 (S54). Then, the image recognition section 22 sends identification information, i.e., (i) the found ratio of the regions and (ii) the image formed in the specific region, to the information comparing section 26 of the control section 8.

With the identification information thus obtained from the image recognition section 22, the information comparing section 26 compares the identification information with page information stored in a storing section of the information tag 51 (S55). The information comparing section 26 then determines whether or not the identification information matches the page information (S56).

In the step S56, if there is a match (YES in S56), the control section 8 approves printing (S57) and finishes the process. On the contrary, if there is no match (NO in S56), the control section 8 disapproves printing (S58) and finishes the process.

In such a manner, the layout comparing process is carried out.

Note that, in the foregoing description, identification information is (i) a ratio of the regions and (ii) an image formed in the specific region. However, identification information may be either (i) or (ii). Further, the identification information may be other kinds of information concerning, for example, a layout of a page to be copied, a position of a picture, a position of a page number, a position of a header, a position of text, a symbol or picture embedded in a specific portion, and/or the like.

The foregoing described the case where kinds of information stored as page information beforehand (e.g. a ratio of the regions to the entire book 50) have been previously determined. Thus, in comparing identification information with page information, the information comparing section 26 compares the same kinds of information.

Further, in the case where kinds of information stored in the information tag 51 as page information are not known, for example, before the image recognition section 22 creates the identification information, the identification information may be created by obtaining information concerning kinds of page information stored in the information tag 51. This enables the information comparing section 26 to compare identification information with the page information.

Figure 9:
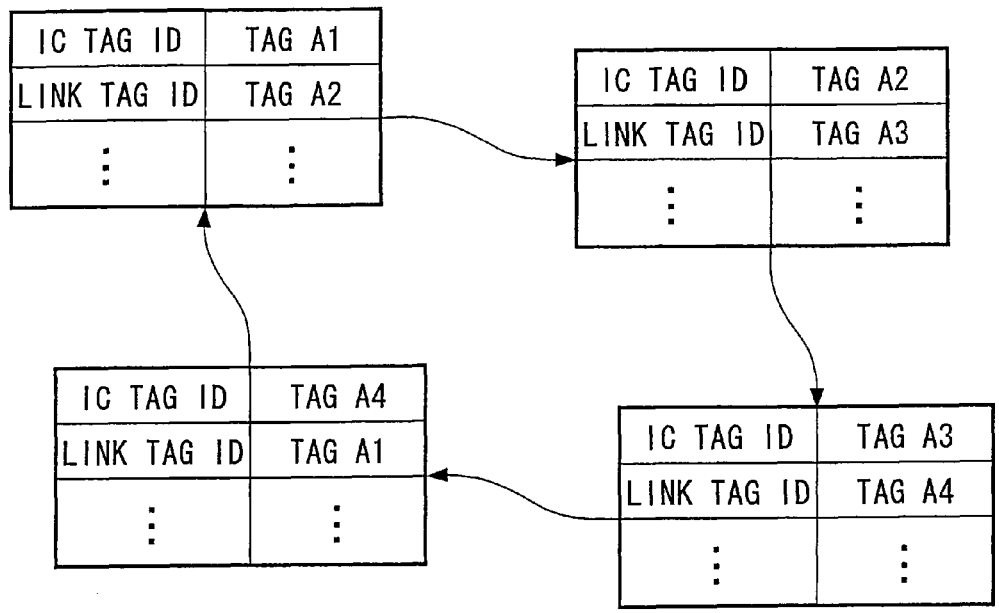
FIG. 9(a) is an explanatory view illustrating the relevance determination process shown in FIG. 6, in which four information tags added to a book are relevant to each other.
FIG. 9(b) is an explanatory view illustrating the relevance determination process shown in FIG. 6, in which four information tags added to a book are not relevant to each other.
Figure 9:
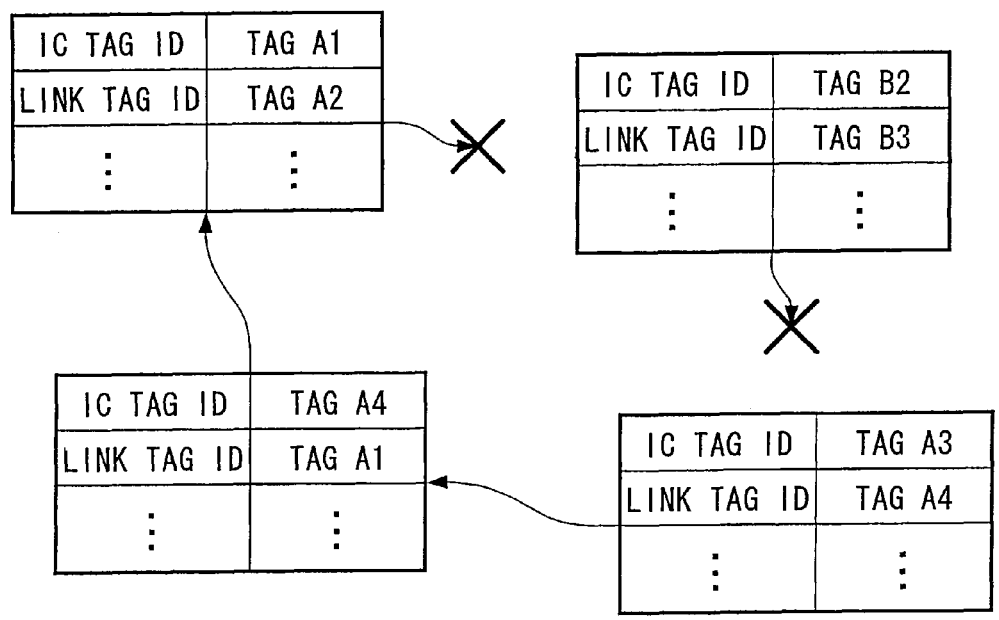
Figure 10:
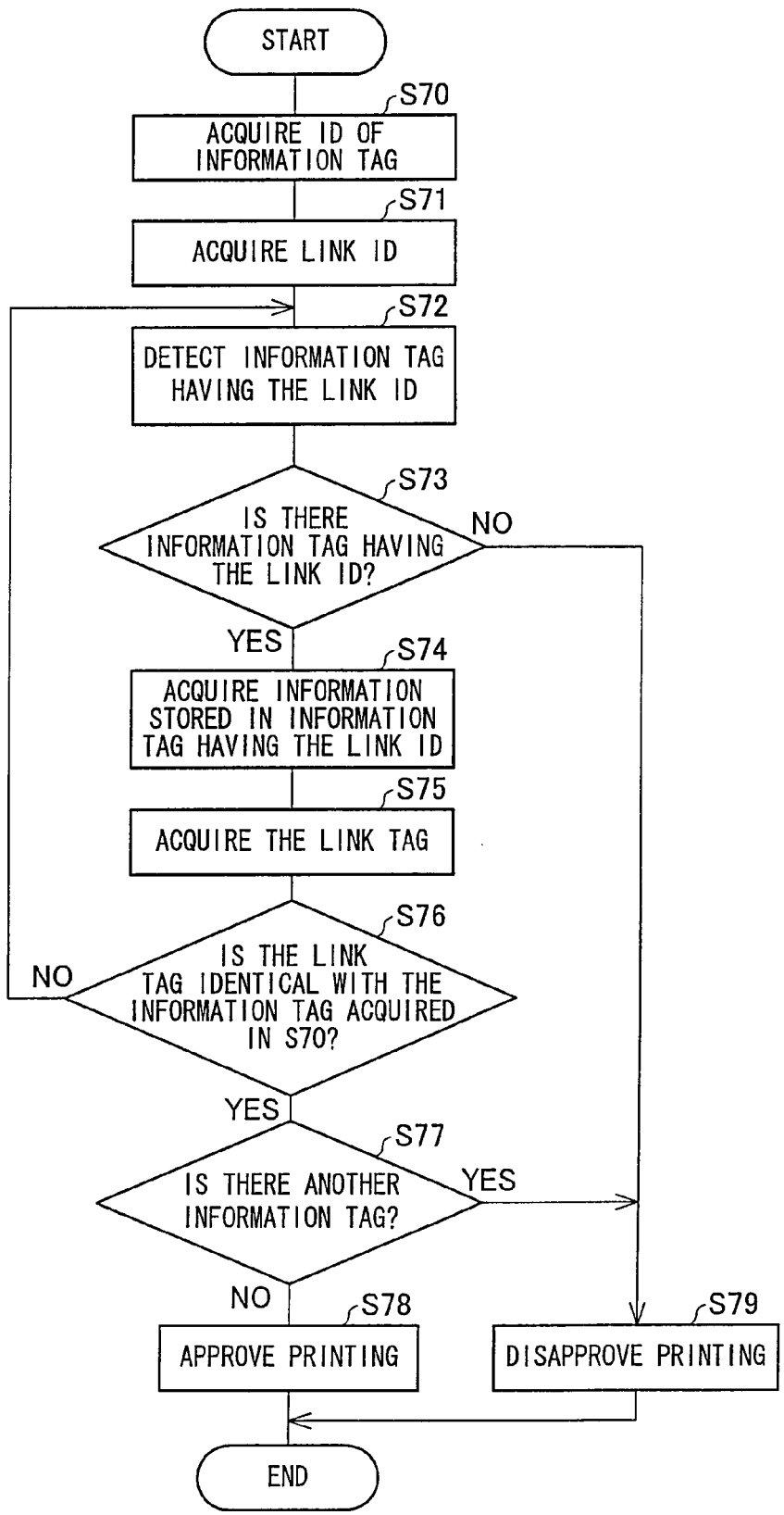
FIG. 10 is a flow chart representing the relevance determination process shown in FIG. 6.

Referring to FIGS. 9 and 10, the following will describe the relevance determining process. The following deals with a case where a plurality of information tags 51 (four in this case) are added to the book 50 and in which information stored in each of the information tags 51 includes an IC tag ID and a link tag ID (relevance information), as shown in FIGS. 2(b) and 2(c).

As shown in FIG. 9(a), four information tags 51 store IC tag IDs, i.e., tag A1, tag A2, tag A3, and tag A4, respectively. Hereinafter, the four information tags 51 are referred to as information tag 51 A1, information tag 51 A2, information tag 51 A3, and information tag 51 A4, respectively.

For example, also in the case where a plurality of information tags 51 are added, book identification information stored in the information tags 51 is obtained by the wireless tag reader 21 and stored in the tag information storing section 25. The relevance determining section 27 then determines, based on the information stored in the tag information storing section 25, whether or not the information tags 51 are relevant to each other.

Specifically, in a case where the relevance determining section 27 reads out information stored in information tag 51 A2, it is found that the information tag 51 A2 has stored tag A3 as a link tag ID. Accordingly, the relevance determining section 27 reads out information stored in information tag 51 A3 having tag A3 as the IC tag ID, and finds that the information tag 51 A3 has stored tag A4 as a link tag ID.

Next, the relevance determining section 27 reads out information stored in information tag 51 A4 having tag A4 as the IC tag ID, and finds that the information tag 51 A4 has stored tag A1 as a link tag ID.

Further, the relevance determining section 27 reads out information stored in information tag 51 A1 having tag A1 as the IC tag ID, and finds that the information tag 51 A1 has stored tag A2 as a link tag ID.

Since information tag 51 A2 having tag A2 as the IC tag ID has been already read out, the relevance determining section 27 finds that the four information tags 51 are relevant to each other. That is, the relevance determining section 27 goes through the information tags 51 from one to the next, so as to determine whether or not all the information tags 51 are relevant to each other.

Further, assume a case as shown in FIG. 9(b) for example, in which information tag 51 A2 is removed and information tag 51 B2 having tag B2 as IC tag ID is added instead. In this case, there exist no information tag 51, which is indicated as a link tag ID of information tag 51 A1 (i.e., information tag 51 A2) and which is indicated as a link tag ID of information tag 51 B2 (i.e., information tag 51 B3). Thus, even by starting from any information tag 51, it is impossible for the relevance determining section 27 to read through the information tags 51 so as to return to an information tag 51 that has been first read out. This causes the relevance determining section 27 to (regard that unauthenticated operation has been made to the information tags 51, so as to) determine that copying is disapproved.

Referring to FIG. 10, the following will describe the relevance determination process.

The relevance determining section 27 reads out, from among a plurality of sets of book identification information stored in the tag information storing section 25, book identification information of an arbitrary information tag 51, so as to acquire an ID (IC tag ID) and a link ID (link tag ID) of the information tag 51 (S70 and S71).

Next, the relevance determining section 27 detects whether or not there is an information tag 51 having an IC tag ID identical with the information tag 51 thus read out (S72). Then, based on the result of detection, the relevance determining section 27 determines whether or not there is an information tag 51 having an IC tag ID identical with the link ID thus read out (S73).

In the step S73, if the relevant information tag 51 is not found (NO in S73), the relevance determining section 27 determines that the information tag 51, which had been initially added to the book 50, was removed. Accordingly, the relevance determining section 27 disapproves printing (S79).

On the contrary, in the step S73, if the relevant information tag is found (YES in S73), the relevance determining section 27 acquires information stored in the information tag 51 having an IC tag ID identical with the link ID thus read out (S74). Accordingly, the relevance determining section 27 acquires the link ID from the information (S75).

Further, the relevance determining section 27 determines whether or not (i) the link ID acquired in the step S75 is identical with (ii) the ID (IC tag ID) acquired in the step S70 concerning the arbitrary information tag 51 (S76).

In the step S76, if it is determined that the IDs are not identical (NO in S76), the sequence goes back to the step S72.

On the contrary, if it is determined that the IDs are identical (YES in S76), the relevance determining section 27 determines whether or not there is an information tag 51 whose information has not been read out (S77).

In the step S77, if the result of determination finds that there is an information tag 51 whose information has not been read out (YES in S77), the relevance determining section 27 determines that an information tag 51 other than the initially added information tag 51 was added, and accordingly determines that printing is not allowed (S79).

On the contrary, in the step S77, if the result of determination finds that there is no information tag 51 whose information has not been read out (NO in S77), the relevance determining section 27 approves printing (S78).

As such, the relevance determining section 27 determines whether or not the plural information tags 51 added to the book 50 are relevant to each other.

Note that, other methods may be used to determine whether or not the plural information tags 51 are relevant to each other.

Specifically, for example, except an IC tag ID of an information tag 51 added to the book 50, other IC tag IDs may be stored in the information tag 51 previously. This makes it possible to determine whether information tags 51 exist whose IC tag IDs are identical with the previously stored IC tag ID. In this way, determination may be made as to whether or not the information tags 51 are relevant to each other.

As described above, an image forming apparatus 1 of the present embodiment includes: an image reading section 2 for reading an image, formed on a book 50 to which an information tag 51 is added, so as to acquire image data; and an image forming section 4 for forming an image on a sheet based on the image data. The image forming apparatus 1 further includes a tag addition determining section 23, an added information determining section 6, and a control section 8. The tag addition determining section 23 determines whether or not the information tag 51 is added to the book 50, and the added information determining section 6 determines whether or not the image data, read by the image reading section 2, contains added information indicating that the information tag 51 is added to the book 50. Further, the control section 8 controls the image forming section 4 not to carry out image forming, when the added information determining section 6 determines that the added information is contained and when the tag addition determining section 23 determines that the information tag 51 is not added to the book 50.

According to the arrangement, if the results of determination made by the added information determining section 6 and determination made by the tag addition determining section 23 find that the information tag 51 is not added to the book 50 and that the image data acquired by the image reading section 2 contains the added information, the control section 8 controls the image forming section 4 not to carry out image forming.

In such a manner, image forming can be prohibited as unauthorized copying, when it is determined that the information tag 51 is removed from the book 50 though the image data indicates that the information tag 51 is added to the book 50.

As such, the image forming section 4 can be normally controlled based on information stored in the information tag 51 added to the book 50. On the contrary, when a storage device for controlling the image forming section 4 has been intentionally removed, image forming operation of the image forming section 4 can be prohibited.

Note that, (i) the added information determining section 6 and the tag addition determining section 23 may determine concurrently whether or not added information is contained (added information determination) and whether or not the information tag 51 is added to the book 50 (information tag 51 determination), respectively. Alternatively, (ii) the tag addition determining section 23 may make the information tag 51 determination after the added information determining section 6 determines that the added information is not contained, or (iii) the added information determining section 6 may make the added information determination after the tag addition determining section 23 determines that the information tag 51 is not added to the book 50.

Further, the image forming apparatus 1 of the present embodiment may include: an image recognition section 22 for extracting, from the image data, identification information specifying an information tag 51 added to the book 50; and an information comparing section 26 for determining whether or not (i) the information tag 51 specified based on the identification information is identical with (ii) the information tag 51 added to the book 50. In the image forming apparatus 1, the control section 8 may control the image forming section 4 based on the result of determination made by the information comparing section 26.

According to the arrangement, the identification information, which specifies the information tag 51 added to the book 50, is added to the image data beforehand so that it is determined whether or not the information tag 51 specified based on the identification information is identical with the information tag 51 currently added to the book 50.

This allows determination to be made as to, for example, whether or not the information tag 51, which had been initially added to the book 50, was replaced by another information tag.

According to the arrangement, it is possible to determine whether or not an information tag 51, currently added to the book 50, has been initially added to the book 50. This prevents an initially added information tag 51 from being removed and replaced by another information tag 51 instead. This prevents unauthorized copying made by adding another information tag 51.

Further, in the image forming apparatus 1 of the present embodiment, the information tag 51 may store page information, which is a property value for specifying an image formed on the book 50. Further, the image forming apparatus 1 may include an image recognition section 22 and an information comparing section 26. The image recognition section 22 obtains the property value from the image data acquired by the image reading section 2. The information comparing section 26 compares (i) the property value stored in the information tag 51 and (ii) the property value obtained by the image recognition section 22, so as to determine whether or not the both values are similar. Further, in the image forming apparatus 1, the control section 8 may control the image forming section 4 based on the result of determination made by information comparing section 26.

According to the arrangement, the page information is stored beforehand in the information tag 51 added to the book 50. Then, it is determined whether the page information thus stored is similar to the property value obtained by analyzing the image data acquired by the image reading section 2. Based on the result of determination, the image forming section 4 is controlled.

Thus, if the result of determination finds that the property value and the page information are not similar for example, image forming is controlled to be restricted regarding that another information tag, other than the information tag which should have been initially added to the book 50, was added to the book 50.

Note that, the following method may be used for the information comparing section 26 to determine whether or not the property value and the page information are similar. For example, when the property value is character information, information elements regarding characters may be compared to calculate a similarity therebetween. Alternatively, when the property value is image information for example, information elements regarding pixels may be compared to calculate a similarity therebetween. Then, if the result of calculation finds that the similarity thus found is at or more than a certain value, it may be determined that they are similar.

Further, in the image forming apparatus 1 of the present embodiment, as the property value, the image recognition section 22 may obtain, based on the image data, information of an image formed on a specific region of the book 50.

According to the arrangement, the image recognition section 22 obtains information of the image formed on a specific region of the book 50 as a property value. This enables the image recognition section 22 to find the property value only by analyzing image data corresponding to the specific region.

Further, in the image forming apparatus 1 of the present invention, a plurality of information tags 51 are added to the book 50, and each of the information tags 51 stores set(s) of relevance information each indicative of a relevance to another one of the information tags 51. The added information determining section 6, when it determines that the information tags 51 are added, reads relevance information from each of the information tags 51. Further, the image forming apparatus 1 may include a relevance determining section 27 for determining, based on relevance information read out by the added information determining section 6, whether or not the plural information tags 51 added to the book 50 are relevant to each other. Further, the control section 8 may control the image forming section 4 based on the result of determination made by the relevance determining section 27.

According to the arrangement, relevance information is read out from the plural information tags 51 added to the book 50, and determination is made as to whether or not the information tags 51 are relevant to each other. Thus, when part of the plural information tags 51 added to the book 50 is removed, it is possible to determine that the information(s) tag 51 were removed.

Further, the book 50 of the present embodiment includes an information tag 51. On the book 50, added information indicative of the addition of the information tag 51 is formed as an image.

The book 50 is constituted by an information storage medium having an image thereon. Examples of the image storage medium are paper and a sheet.

According to the arrangement, the book 50 includes an information tag 51, and added information indicative of the addition of the information tag 51 is formed as an image on the book 50. Since the added information is stored as an image, when the information tag 51 is removed from the book 50 for example, it can be found that the information tag 51 was removed.

Further, in the book 50 of the present embodiment, the added information may be an image having no character.

According to the arrangement, the added information is an image having no character. This allows an image, which a human neither recognizes nor determines as added information, to be the added information.

Further, in the book 50 of the present embodiment, the added information may be a bar code.

According to the arrangement, the added information is a bar code. This allows the added information to be added in such a manner that machines can easily read the added information.

Further, in the book 50 of the present embodiment, the added information may be formed so as to overlap an image other than the added information.

According to the arrangement, the added information is formed in a position where an image other than the added information is formed. This allows the added information to be added in such a manner that a human cannot easily recognize the added information.

Further, the book 50 of the present embodiment may include a plurality of information tags 51, and the information tags 51 may store set(s) of relevance information each indicative of a relevance to another one of the information tags.

According to the arrangement, each of the information tags 51 stores set(s) of relevance information each indicative of a relevance to another one of the information tags. This allows, even when one of the information tags 51 was removed for example, the removal of the information tag 51 to be found by reading information stored in the remaining information tags 51.

Further, in the book 50 of the present embodiment, the identification information for specifying the information tag 51 may be contained in the form of an image.

According to the arrangement, an image formed on the book 50 contains identification information for specifying the information tag 51. That is, by reading the identification information, it is possible to determine whether or not the information tag 51, added to the book 50, has been initially added. For example, when an information tag 51, initially added to the book 50 was removed and replaced by another information tag instead, the removal of the initially added information tag 51 can be found by reading the identification information.

Further, an image forming apparatus 1 of the present embodiment includes: an image reading section 2 for reading a book 50 so as to acquire image data; and an image forming section 4 for forming an image on a sheet based on the image data. The image forming apparatus 1 further includes a tag addition determining section 23, an added information determining section 6, and a control section 8. The tag addition determining section 23 determines whether or not the information tag 51 is added to the book 50. The added information determining section 6 determines whether or not the image data, read by the image reading section 2, contains added information indicating that an information tag 51 is added to the book 50. The information tag 51 at least stores restriction information indicative of whether or not image forming based on the book 50 is restricted. Further, the control section 8 controls the image forming section 4 not to carry out image forming, when the added information determining section 6 determines that the added information is contained and when the tag addition determining section 23 determines that the information tag 51 is not added to the book 50.

When added information and/or identification information is embedded in (added to) the image formed on the book 50, it is preferable that the added information and/or identification information be embedded in such a manner that human eyes cannot recognize the embedded information. As to how the added information and/or identification information is added to the book, for example, (i) pattern(s) are added in a color that human eyes cannot easily perceive and recognize (e.g. bright yellow etc. on a white sheet), (ii) pattern(s) are added that can be read in non-visible region such as infrared rays, (iii) data (pattern) is embedded in an edge of a letter, or (iv) other methods may be employed. Alternatively, the added information and/or identification information may be formed on the book 50 as pattern(s) in the form of, for example, a bar code that allows machines to easily read such information. The position where the added information and/or identification information is formed is not particularly limited. For example, the added information and/or identification information may be formed in a header or footer position, or may be formed so as to overlap the image formed on the book 50.

Further, the foregoing described the case by way of example where an information tag 51 electrically storing information serves to store book identification information. However, instead of the information tag 51, for example, paper or the like may be used on which the book identification information is stored.

The invention being thus described will not be limited to the embodiment, and may be varied in many ways within the scope of the following claims. That is, all embodiments to be made within the scope of the claims from the combination of suitably modified technical means are intended to be included within the technical scope of the invention.

Finally, each block of the image forming apparatus 1, particularly, the control section 8, the information acquiring section 7, the added information determining section 6 may be constituted by a hardware logic, or may be realized by software using a CPU as will be described below.

That is, the image forming apparatus 1 includes: (i) a CPU (Central Processing Unit) for implementing an instruction of a control program which realizes the functions; (ii) a ROM (Read Only Memory) for storing the program; (iii) a RAM (Random Access Memory) for expanding the program; (iv) a memory device (storage medium) such as a memory for storing the program and various types of data; (v) and the like. Thus, the object of the present invention is achieved by: (i) providing the image forming apparatus 1 with a storage medium in which a computer-readable program code (executable program, intermediate code program, a source program) of a program for controlling the image forming apparatus 1, i.e., software for realizing the functions and (ii) causing a computer (or CPU, MPU (Micro Processing Unit)) to read out and execute the program code stored in the storage medium.

Examples of the storage medium are: tapes such as a magnetic tape and a cassette tape; magnetic disks such as a floppy® disk and a hard disk; and optical disks such as a CD-ROM (Compact Disk Read Only Memory), a magnetic optical disk (MO), a mini disk (MD), a digital video disk (DVD), a CD-R (CD-Rewritable), and the like. Further, the storage medium may be: a card such as an IC card (including a memory card), an optical card, or the like; or a semiconductor memory such as a mask ROM, an EPROM (Electrically Programmable Read Only Memory), an EEPROM (Electrically Erasable Programmable Read Only Memory), a flash ROM, or the like.

Further, the image forming apparatus 1 may be connected to the communication network, so as to supply the program code to the image forming apparatus 1 via the communication network. The communication network is not specifically limited, and Internet, Intranet, Extranet, LAN (Local Region Network), ISDN (Integrated Services Digital Network), VAN (Value Added Network), CATV (Cable TV) communication network, virtual private network, telephone line network, mobile communication network, satellite communication network, or the like may be used, for example. Further, the transmission medium constituting the communication network is not particularly limited. Examples of the transmission medium are (i) a wired line using an IEEE1394, a USB (universal serial bus), a power-line communication, a cable TV line, a telephone line, an ADSL line, or the like; or (ii) a wireless line using infrared rays such as IrDA or remote control, radio such as Bluetooth®, 802.11 radio, HDR (High Data Rate), a mobile phone network, a satellite connection, a terrestrial digital network, or the like. Note that, the present invention can be realized by a computer data signal which represents the aforesaid program code, and which is electrically sent, and which is embedded in a carrier wave.

An image forming apparatus of the present invention is suitably applicable in copy machines which particularly copy a work and the like, and image forming apparatuses such as a digital complex machine and the like.

As described above, according to the present invention, an image forming apparatus includes an image reading section for reading an image, formed on an original document, so as to acquire image data; and an image forming section for forming an image on a sheet based on the image data, the apparatus controlling, when a storage device is added to the original document, the image forming section based on information stored in the storage device, the image forming apparatus, further including: storage device determination means for determining whether or not the storage device is added to the original document; added information determination means for determining whether or not the image data, read by the image reading section, contains added information indicating that the storage device is added to the original document; and control means for controlling, both when the added information determination means determines that the added information is contained and the storage device determination means determines that the storage device is not added to the original document, the image forming section not to carry out image forming based on the image data of the original document.

The storage device stores information for controlling image forming operation of the image forming section (restriction information). The storage device may be any devices capable of storing information and at least includes an IC tag (wireless tag), flash memory, a hard disk, or the like, for example.

According to the arrangement, the control means controls the image forming section not to carry out image forming, when the results of determination made by the added information determination means and determination made by the storage device determination means find that the storage device is not added to the original document and that the image data, acquired by the image reading section, contains the added information.

Thus, when it is determined that the storage device is removed from the original document though the image data indicates that the storage device is added to the original document, image forming can be prohibited as unauthorized copying.

As such, the image forming section can be normally controlled based on information stored in the storage device added to the original document. On the contrary, when the storage device for controlling the image forming section has been intentionally removed, image forming operation of the image forming section can be prohibited.

Note that, (i) the added information determination means and the storage device determination means may determine concurrently whether or not added information is contained (added information determination) and whether or not the storage device is added to the original document (storage device determination), respectively. Alternatively, (ii) the storage device determination means may make the storage device determination after the added information determination means determines that the added information is not contained, or (iii) the added information determination means may make the added information determination after the storage device determination means determines that the storage device is not added to the original document.

The image forming apparatus of the present invention may be arranged such that the added information contains identification information for specifying the storage device added to the original document, the image forming apparatus, further including: extracting means for extracting the identification information from the added information; and device determination means for determining, based on the identification information and the information stored in the storage device, whether or not the storage device specified by the identification information is identical with the storage device added to the original document, wherein, when the device determination means determines that the storage device specified based on the identification information is not identical with the storage device added to the original document, the control means controls the image forming section not to carry out image forming based on the image data of the original document.

The identification information is used to specify the storage device added to the original document. Specifically, the identification information is inherent information of the storage device (e.g. ID number) or the like.

The device determination means, for example, compares (i) identification information extracted from the added information with (ii) inherent information being specific to the storage device and stored in the storage device.

According to the arrangement, the identification information, which specifies the storage device added to the original document, is added beforehand to the original document. This makes it possible to determine whether or not the storage device, specified with the identification information contained in the added information, is identical with the storage device that is currently added to the original document.

For example, it can be determined whether or not the storage device, initially added to the original document, was replaced by another storage device.

According to the arrangement, it can be thus determined whether the storage device added to the original document has been initially added to the original document. This prevents the initially added storage device from being removed and replaced by another storage device instead. Thus, it becomes possible to prevent unauthorized copying to be made by adding another storage device.

The image forming apparatus of the present invention may be arranged such that the storage device stores a property value for specifying the image formed on the original document, the image forming apparatus, further including: property value calculating means for finding, based on the image data acquired by the image reading section, a property value for specifying the image formed on the original document; and similarity determination means for comparing a first property value stored in the storage device with a second property value found by the property value calculating means, so as to determine whether or not the first and second values are similar, wherein, when the similarity determination means determines that the first and second values are not similar, the control means controls the image forming section not to carry out image forming based on the image data of the original document.

The property values include at least one of the following information elements: (A) layout information concerning a layout of an image formed on an original document, (B) region information obtained by carrying out region separation process on an image formed on the original document, (C) character information concerning symbols, numeric characters, logos, words, and the like, (D) size information indicating the size of the image, (E) header (footer) information indicating a position of a header and/or footer of the original document, (F) information of characters stored in the header region and/or the footer region, and (G) image information relating to the image itself formed on the original document.

Further, the property value calculating means finds the second property value through a process, for example, such as (1) separating the image data into regions to calculate a ratio of the separated regions, (2) extracting an image in a specific region of the image data, or (3) extracting a specific letter string by performing an OCR process on a specific region of the image data.

According to the arrangement, the first property value is stored beforehand in the storage device added to the original document, so that it can be determined whether or not the first stored property value and the second property value found by the property value calculating means are similar. If no similarity is found, the image forming section is controlled not to carry out image forming operation based on the image data.

If the result of determination finds that the property value (second property value) and the stored property value (first property value) are not similar, image forming is restricted regarding that a storage device, other than the storage device which should have been initially added to the original document, was added to the original document.

Note that, the following method may be also used for the similarity determination means to determine whether or not the property value and the storage property value are similar. For example, when the property value is character information, information elements regarding characters may be compared to calculate a similarity therebetween. Alternatively, when the property value is image information for example, information elements regarding pixels may be compared to calculate a similarity therebetween. Then, if the result of calculation finds that the similarity thus found is at or more than a certain value, it may be determined that they are similar.

The image forming apparatus of the present invention may be arranged such that the property value calculating means finds, as the property value from the image data, information acquired from an image formed on a specific region of the original document.

According to the arrangement, the property value calculating means obtains information of the image formed on a specific region of the original document as a property value. This enables the property value calculating means to find the property value only by analyzing image data corresponding to the specific region.

The image forming apparatus of the present invention may be arranged such that a plurality of storage devices are added to the original document, and each of the storage devices stores relevance information indicative of a relevance to another one of the storage devices, the image forming apparatus, further including relevance determination section for determining, based on the relevance information, whether or not the storage devices added to the original document are relevant to each other, wherein: when the added information determination means determines that the storage devices are added to the original document, the relevance information is provided to the relevance determination means from each of the storage devices, and the control means controls, when the relevance determination means determines that the storage devices are not relevant to each other, the image forming section not to carry out image forming based on the image data of the original document.

According to the arrangement, with the relevance information read out from the plural storage devices added to the original document, it is determined whether or not the plural storage devices are relevant to each other. Accordingly, when part of the plural storage devices added to the original document is removed, it is determined that the storage device(s) were removed.

To solve the foregoing problem, there is provided a method for controlling an image forming apparatus including: an image reading section for reading an image, formed on an original document, so as to acquire image data; and an image forming section for forming an image on a sheet based on the image data, the apparatus controlling, when a storage device is added to the original document, the image forming section based on information stored in the storage device, the method including the steps of: (a) determining whether or not the storage device is added to the original document; (b) determining whether or not the image data, read by the image reading section, contains added information indicating that the storage device is added to the original document; and (c) controlling, both when it is determined in the step (b) that the added information is contained and it is determined in the step (a) that the storage device is not added to the original document, the image forming section not to carry out image forming based on the image data of the original document.

Note that, the image forming apparatus may be realized by a computer. In this case, (i) a control program which realizes an image forming apparatus by operating the computer to serve as each of the means and (ii) a computer-readable storage medium in which the control program is stored fall within the scope of the present invention.

An original document of the present invention includes at least one storage device, wherein added information is formed as an image, the added information indicating addition of the storage device.

The original document is constituted by an information storage medium having an imaged formed thereon. Examples of the information storage medium are paper and a sheet. Examples of the original document are written documents such as printed books.

According to the arrangement, the original document includes a storage device, and added information indicating the addition of the storage device is formed as an image on the original document. Since the added information is stored as an image, when the storage device is removed from the original document for example, it can be found that the storage device has been removed.

In the original document of the present invention, the added information may be an image having no character.

According to the arrangement, added information is an image having no character. This allows an image, which a human neither recognizes nor determines as added information, to be the added information.

In the original document of the present invention, the added information may be a bar code.

According to the arrangement, the added information is a bar code. This allows the added information to be added in such a manner that machines can easily read the added information.

Note that, the bar code includes a two dimensional bar code (QR code), as well as an ordinary bar code.

In the original document of the present invention, the added information may be formed so as to overlap an image other than the added information.

According to the arrangement, the added information is formed so as to overlap an image other than the added information. This allows the added information to be added in such a manner that a human cannot easily recognize the added information. Particularly, it is desirable that the added information be embedded in an original image as digital watermark, which does not easily allow only the added information to be disabled without affecting original image(s) other than the added information. This gives toughness against unauthorized operation to an IC tag, which is added to an original document and which flexibly controls copying, enabling the IC tag to have the toughness equivalent to digital watermark.

The original document of the present invention may be arranged such that the number of the storage device is more than one, and each storage device stores relevance information indicative of a relevance to another storage device.

According to the arrangement, each of the storage devices stores set(s) of relevance information each indicative of a relevance to another one of the storage devices. This allows, even when one of the plural storage devices was removed for example, the removal of the storage device to be found by reading information stored in the remaining storage devices.

The original document of the present invention may contain, as an image, identification information for specifying the storage device.

According to the arrangement, the image formed on the original document contains identification information for specifying the storage device. That is, by reading the identification information, it is possible to determine whether or not the storage device, added to the original document, has been initially added. For example, even when the storage device, initially added to the original document was removed and another storage device was added instead, the removal of the initially added storage device can be found by reading the identification information.

Note that, the identification information is, for example, identification information (ID information) uniquely added to a storage device, or other information.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. An image forming apparatus, comprising an image reading section for reading an image, formed on an original document, so as to acquire image data; and an image forming section for forming an image on a sheet based on the image data, said apparatus controlling, when a storage device is added to the original document, the image forming section based on information stored in the storage device, said image forming apparatus, further comprising:

storage device determination means for determining whether or not the storage device is added to the original document, the storage device being removable from the original document independent of any image data acquired or to be acquired from the original document;

added information determination means for determining whether or not the image data, read by the image reading section, contains added information indicating that the storage device is added to the original document;

relevance determination means for determining, by going through relevance information stored in a plurality of storage devices from one to the next, whether or not all the relevance information is relevant to each other, when the storage device determination means determines that the storage devices are added to the original document; and control means for controlling the image forming section not to carry out image forming based on the image data of the original document, when (i) the added information determination means determines that the added information is contained in the image data and (ii) the storage device determination means determines that the storage device is not added to the original document, or when (i) a plurality of storage devices are added to the original document, (ii) each of the storage devices stores relevance information indicative of a relevance to another one of the storage devices, (iii) the added information determination means determines that the added information is contained in the image data, (iv) the storage device determination means determines that the plurality of storage devices are added to the original document, and (v) the relevance determination means determines that all the relevance information is not relevant to each other; and wherein said image on a sheet does not contain a storage device and said image forming section embeds copy prohibition information on said image on a sheet, so as to prevent said image on a sheet being used as an original document.

2. A method for controlling an image forming apparatus comprising: an image reading means for reading an image, formed on an original document, so as to acquire image data; and an image forming means for forming an image on a sheet based on the image data, said apparatus controlling, when a storage device is added to the original document, the image forming means based on information stored in the storage device, said method comprising the steps of:

(a) determining whether or not the storage device is added to the original document, the storage device being removable from the original document independent of any image data acquired or to be acquired from the original document;

(b) determining whether or not the image data, read by the image reading means, contains added information indicating that the storage device is added to the original document;

(c) determining, by going through relevance information stored in a plurality of storage devices from one to the next, whether or not all the relevance information is relevant to each other, when it is determined in step (a) that the storage devices are added to the original document; and (d) controlling the image forming means not to carry out image forming based on the image data of the original document, when (i) it is determined in step (b) that the added information is contained in the image data and (ii) it is determined in step (a) that the storage device is not added to the original document, or when (i) a plurality of storage devices are added to the original document, (ii) each of the storage devices stores relevance information indicative of a relevance to another one of the storage devices, (iii) it is determined in step (b) that the added information is contained in the image data, (iv) it is determined in step (a) that the plurality of storage devices are added to the original document, and (v) it is determined in step (c) that all the relevance information is not relevant to each other; and wherein said image on a sheet does not contain a storage device and said image forming section embeds copy prohibition information on said image on a sheet, so as to prevent said image on a sheet being used as an original document.

* * * * *